(12) United States Patent
Kobayashi et al.

(10) Patent No.: US 10,719,213 B2
(45) Date of Patent: Jul. 21, 2020

(54) SEWING MACHINE

(71) Applicant: JANOME SEWING MACHINE CO., LTD., Hachioji-shi, Tokyo (JP)

(72) Inventors: Nobuhiko Kobayashi, Hachioji (JP); Takeshi Kongo, Hachioji (JP)

(73) Assignee: JANOME SEWING MACHINE CO., LTD., Hachioji-shi, Tokyo (JP)

( * ) Notice: Subject to any disclaimer, the term of this patent is extended or adjusted under 35 U.S.C. 154(b) by 134 days.

(21) Appl. No.: 15/455,135

(22) Filed: Mar. 10, 2017

(65) Prior Publication Data

US 2018/0024732 A1 Jan. 25, 2018

(30) Foreign Application Priority Data

Jul. 21, 2016 (JP) .................... 2016-143286

(51) Int. Cl.
*D05B 19/00* (2006.01)
*G06F 3/0484* (2013.01)
*G06F 3/0481* (2013.01)
*G06F 3/0482* (2013.01)
*G06F 3/0488* (2013.01)

(52) U.S. Cl.
CPC ....... *G06F 3/04847* (2013.01); *D05B 19/006* (2013.01); *G06F 3/0482* (2013.01); *G06F 3/0484* (2013.01); *G06F 3/04817* (2013.01); *G06F 3/04886* (2013.01)

(58) Field of Classification Search
CPC ........ D05B 19/00; D05B 19/02; D05B 19/04; D05B 19/006; D05B 19/08; D05B 19/085; D05B 19/105; G06F 3/04847
See application file for complete search history.

(56) References Cited

U.S. PATENT DOCUMENTS

| | | | | | |
|---|---|---|---|---|---|
| 5,099,777 | A | * | 3/1992 | Mori | D05B 19/105 112/445 |
| 5,924,373 | A | * | 7/1999 | Tomita | D05B 19/105 112/102.5 |
| 6,016,758 | A | * | 1/2000 | Tomita | D05B 19/04 112/102.5 |

(Continued)

FOREIGN PATENT DOCUMENTS

| | | |
|---|---|---|
| JP | H04-075683 A | 3/1992 |
| JP | H05-009475 U | 2/1993 |

(Continued)

OTHER PUBLICATIONS

Japanese Notice of Reasons for Refusal dated May 7, 2020.

*Primary Examiner* — Nathan E Durham
(74) *Attorney, Agent, or Firm* — Yokoi & Co., U.S.A.; Toshiyuki Yokoi

(57) ABSTRACT

The present invention provides a sewing machine that enables to switch frequently used functions during the sewing work with good usability, validate only the indicator related to the work among a plurality of indicators, and enables GUI operations by a screen display unit. Thus, high operability can be achieved. The sewing machine includes: a setting unit for setting operation buttons related to desired sewing work; an operation display unit for displaying the operation buttons set by the setting unit, the operation display being arranged at an arm part; and a screen display unit arranged at a position different from the operation display unit.

7 Claims, 11 Drawing Sheets

(56) References Cited

U.S. PATENT DOCUMENTS

| | | | | |
|---|---|---|---|---|
| 6,095,067 A | * | 8/2000 | Tomita | D05B 19/105 112/102.5 |
| 6,321,671 B1 | * | 11/2001 | Tomita | D05B 19/006 112/102.5 |
| 7,218,986 B2 | | 5/2007 | Yoshimura et al. | |
| 2007/0221106 A1 | * | 9/2007 | Nishida | D05B 19/105 112/2 |
| 2009/0050038 A1 | * | 2/2009 | Ishii | D05B 1/24 112/157 |

FOREIGN PATENT DOCUMENTS

| | | |
|---|---|---|
| JP | 2002-172292 A | 6/2002 |
| JP | 2002-253885 A | 9/2002 |
| JP | 2005-087343 A | 4/2005 |
| JP | 2006-271598 A | 10/2006 |
| JP | 2007-252764 A | 10/2007 |

* cited by examiner

Fig. 1

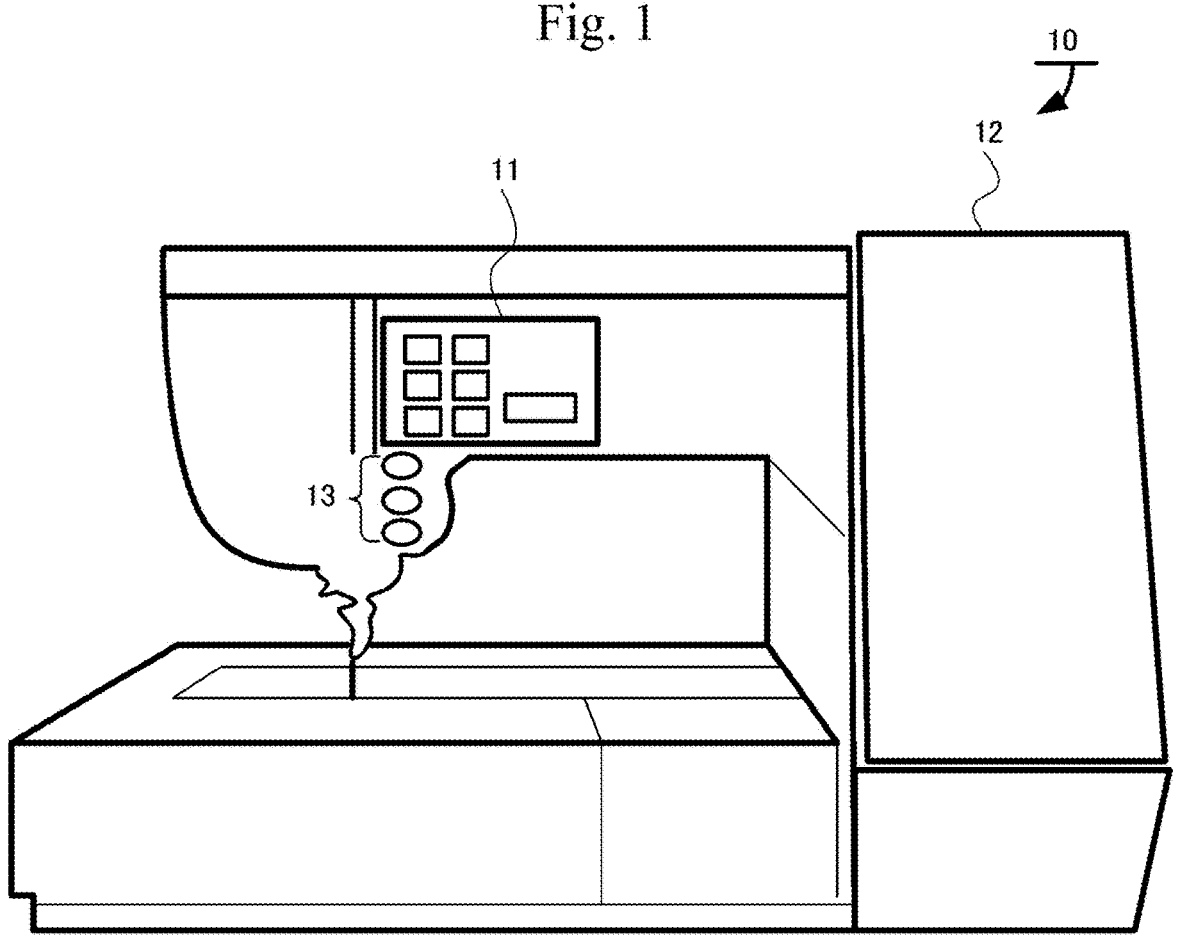

Fig. 2

| Classification of work | List of functions |
|---|---|
| Sewing execution | Start sewing, Temporary stop |
| Sewing operation (fray stopping) | Back stitch, Stop stitch, Shift of top/dead point of needle bar, Presser lift |
| Manual adjustment of sewing | Amplitude amount adjustment, Feed amount adjustment, Thread tensioner adjustment |
| Thread operation | Threading, Thread cutting, Lower thread winding |
| Pattern selection | Selection of icon, Selection of pattern number, Selection of use |

Fig. 3

| Classification of work | List of functions |
|---|---|
| Sewing execution | Start embroidery, Temporary stop |
| Sewing operation (frame moving) | Forward/backward movement of embroidery frame, Adjustment of embroidery position in ±X/Y direction |
| Thread operation | Threading, Thread cutting, Lower thread winding |
| Pattern selection | Selection of icon, Selection of file name, Wired/wireless reception from outside |
| Editing of pattern | Combination of patterns, Position adjustment, Rotation, Magnification/reduction, Color change, Character selection |

Fig. 4

| Classification of work | List of functions |
|---|---|
| Various settings | Settings of normal sewing, Settings of embroidery sewing, Settings of wireless LAN |
| Operation explanation | Illustration of still image, Reproduction of moving image |

Fig. 5

| Correspondence of buttons at same position | |
|---|---|
| Normal sewing mode | Embroidery sewing mode |
| Back stitch | Backward movement of embroidery frame |
| Stop stitch | Adjustment of embroidery position in -X direction |
| Shift of top/bottom dead point of needle bar | Adjustment of embroidery position in -Y direction |
| Presser lift | ---- |
| Feed amount adjustment | Forward movement of embroidery frame |
| Amplitude amount adjustment | Adjustment of embroidery position in +X direction |
| Thread tensioner adjustment | Adjustment of embroidery position in +Y direction |

SEWING MACHINE

CROSS-REFERENCES TO RELATED APPLICATIONS

This patent specification is based on Japanese patent application, No. 2016-143286 filed on Jul. 21, 2016 in the Japan Patent Office, the entire contents of which are incorporated by reference herein.

BACKGROUND OF THE INVENTION

1. Field of the Invention

The present invention relates to a sewing machine.

2. Description of the Related Art

In recent years, the sewing machine is highly functionalized, and the sewing machine is required to display colorful patterns in detail, display a lot of stored patterns in a list, and edit the selected pattern, for example. In addition the sewing machine is required to display an operating status in real time during a sewing work. For example, Patent document 1 discloses a sewing machine where, in addition to a display unit to display an arbitrarily pattern selected from a group of patterns, a second display unit is arranged at a front operation surface of a head part of the sewing machine near a jew part to display only a display information corresponding to the currently executing mode while associating it with the display unit.

In addition, Patent document 2 discloses a sewing machine where an electronic paper is provided to keep a display content even after a liquid crystal panel and a sewing machine are powered off. The electronic paper is arranged near an operation target position or from an upper surface of an arm part to the front surface of a head part to display operation procedure information for explaining the operation. Here, the electronic paper displays a sewing reference line and warning information, for example, as the operation procedure information. In addition, the liquid crystal panel is arranged on the front surface of the arm part. On the liquid crystal panel, an operation method for explaining "procedure of setting upper thread" is displayed, for example.

[Patent document 1] Japanese Unexamined Utility Model Application Publication No. H05-009475

[Patent document 2] Japanese Unexamined Patent Application Publication No. 2007-252764

BRIEF SUMMARY OF THE INVENTION

In the technology of Patent document 1, operation information of the embroidery sewing can be easily confirmed in real time during the work of the embroidery sewing. However, the work of the sewing should be stopped to change the function when starting the sewing (embroidery), temporarily stopping the sewing, backstitching, performing stop sewing or moving an embroidery flame forward/backward, for example. Thus, usability is not good. In addition, since a large-screen display unit enabling GUI (Graphical User Interface) operations (graphical operations) is not provided, it is difficult to edit an embroidery pattern, for example.

Also in the technology of Patent document 2, the operation can be done while looking at the operation procedure information. However, similar to Patent document 1, the work of the sewing should be stopped to change the function when starting the sewing (embroidery), temporarily stopping the sewing, backstitching, performing stop sewing or moving an embroidery flame forward/backward, for example. Thus, usability is not good. In addition, since a large-screen display unit enabling GUI operations (graphical operations) is not provided, it is difficult to edit an embroidery pattern, for example. Furthermore, since the electronic paper is used, the electronic paper is displayed regardless of ON/OFF of the power of the sewing machine. Thus, the display of the electronic paper obstructs the operation.

There is a desire to look fixedly at a needle and a needle bar during the sewing work. Because of that, there is a desire to put the operation buttons and indicators for the sewing control in the visual field. Namely, when performing the sewing operation in both cases of a normal sewing mode and an embroidery sewing mode, although the user wants to perform the sewing work in a state that the operation buttons are arranged near the needle root, it is difficult to arrange all the buttons and indicators of the same mode at the same position because there is not space enough to arrange a large display unit near the needle root due to the structure of the sewing machine. On the other hand, there is a desire to carry out fine operation such as editing of the embroidery pattern on a high-definition large screen.

The present invention provides a sewing machine that enables to switch frequently used functions during the sewing work with good usability, validate only the indicator related to the work among a plurality of indicators, and enables GUI operations by a screen display unit. Thus, high operability can be achieved.

Embodiment 1: One or more embodiments of the present invention propose a sewing machine, comprising: a setting unit for setting operation buttons related to desired sewing work; an operation display unit for displaying the operation buttons set by the setting unit, the operation display being arranged at an arm part; and a screen display unit arranged at a position different from the operation display unit.

Embodiment 2: One or more embodiments of the present invention propose a sewing machine, wherein the operation display unit is arranged at a left side from a center in a front view of the arm part.

Embodiment 3: One or more embodiments of the present invention propose a sewing machine, further comprising: a display position determining unit for determining a display position of the operation buttons in the operation display unit.

Embodiment 4: One or more embodiments of the present invention propose a sewing machine, wherein the screen display unit is arranged at a leg column part which is connected to the arm part.

Embodiment 5: One or more embodiments of the present invention propose a sewing machine, wherein the screen display unit is used for GUI operations.

Embodiment 6: One or more embodiments of the present invention propose a sewing machine, wherein the setting unit sets the operation buttons corresponding to a normal sewing operation or an embroidery sewing operation.

Embodiment 7: One or more embodiments of the present invention propose a sewing machine, further comprising: a selection unit for making a user select the operation buttons related to a desired sewing operation from all of the operation buttons which are displayed on the screen display unit and related to sewing operations.

Embodiment 8: One or more embodiments of the present invention propose a sewing machine, further comprising: an estimation unit for estimating the operation buttons related to a desired sewing operation based on an operation history of a user from all of the operation buttons which are displayed on the screen display unit and related to sewing operations.

Embodiment 9: One or more embodiments of the present invention propose a sewing machine, further comprising: a detection unit for detecting a usage condition of a user; and a control unit for controlling to turn on/off the operation display unit or the screen display unit based on the usage condition detected by the detection unit.

By using one or more embodiments of the present invention, frequently used functions can be switched during the sewing work with good usability, only the indicator related to the work can be validated among a plurality of indicators, and the GUI operations can be enabled by the screen display unit. Thus, high operability can be achieved.

BRIEF DESCRIPTION OF THE DRAWINGS

FIG. 1 is an outside configuration diagram of a sewing machine concerning an embodiment of the present invention.

FIG. 2 is a drawing showing a list of functions of a normal sewing mode in the sewing machine concerning an embodiment of the present invention.

FIG. 3 is a drawing showing a list of functions of an embroidery sewing mode in the sewing machine concerning an embodiment of the present invention.

FIG. 4 is a drawing showing a list of functions common for both the normal sewing mode and the embroidery sewing mode in the sewing machine concerning an embodiment of the present invention.

FIG. 5 is a drawing illustrating display items switched depending on the mode in the sewing machine concerning an embodiment of the present invention.

DETAILED DESCRIPTION OF THE INVENTION

Figure 6:
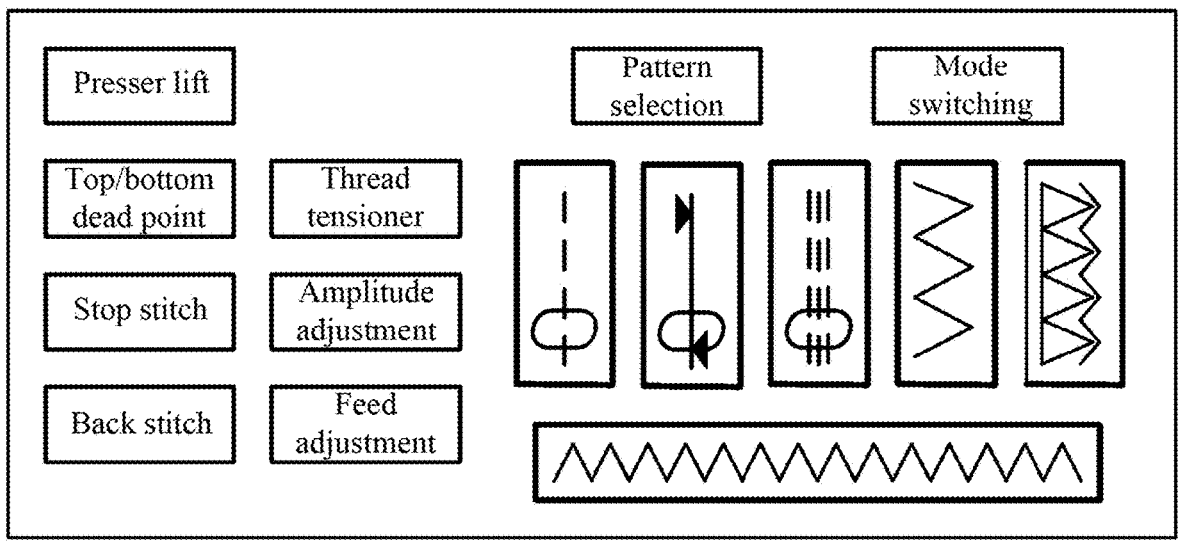
FIG. 6 is a drawing showing an arrangement example of buttons of the normal sewing mode in the sewing machine concerning an embodiment of the present invention.

Hereafter, embodiments of the present invention will be explained in detail using the drawings. In the specification, claims and abstract, a work required for sewing is referred to as "sewing work," an action of operating the sewing machine for sewing (e.g., an action of pressing or continuously pressing the button) is referred to as "sewing operation," and a state of continuing/stopping a sewing action of the sewing machine by the sewing operation is referred to as "sewing execution."

Embodiments

By using FIG. 1 to FIG. 15, the sewing machine concerning an embodiment of the present invention will be explained.

Outside Configuration of Sewing Machine

FIG. 1 shows an outside configuration of the sewing machine concerning the present embodiment. As shown in FIG. 1, a sewing machine 10 concerning the present embodiment has an operation display unit 11 arranged at a left side from a center in a front view of an arm part, especially near a needle root, and a high-definition screen display unit 12 (GUI screen) arranged at a position different from the operation display unit, especially at a front surface of a leg column part connected to the arm part. Note that other screens can be provided in addition to the operation display unit 11 and the screen display unit 12. Since the operation display unit 11 is arranged near the needle root of the arm part, the contents displayed on the operation display unit 11 can be captured in the visual field of viewing the needle root. Thus, operability of the user is increased. In addition, since the high-definition screen display unit 12 (GUI screen) is arranged at the front surface of the leg column part, fine operation such as editing of the embroidery pattern can be carried out without stress, for example.

The operation display unit 11 and the screen display unit 12 are constituted of a touch panel. The display of the operation display unit 11 and the screen display unit 12 can be switched according to the mode. Operation buttons can be selected by touch operation. Backlight lighting can be independently controlled each for the operation display unit 11 and the screen display unit 12. The default arrangement of the operation buttons of the operation display unit 11 can be changed for each user. Because of this, frequently used operation buttons can be arranged at an easily operable position for the user. Thus, convenience of the user is improved. In addition, buttons related to start/stop of sewing, threading and thread cutting which are frequently used in both the normal sewing mode and the embroidery sewing mode are grouped as a tact switch 13 arranged at the lower part of the operation display unit 11. As explained above, since the buttons related to the frequently used functions in both modes are arranged closer to the needle root as the tact switch 13, convenience of the user can be improved.

Functions of Each Mode

The functions shown in FIG. 2 to FIG. 4 are examples of the operation buttons and screen interfaces required for the sewing work of the sewing machine.

As shown in FIG. 2, the normal sewing mode has the following functions according to the classification of the work. In Sewing execution, functions such as Start sewing and Temporary stop are included. In Sewing operation (fray stopping), functions such as Back stitch, Stop stitch, Shifting top/bottom dead point of needle bar and Presser lift are included, for example. In Manual adjustment of sewing, functions such as Amplitude amount adjustment, Feed amount adjustment and Thread tensioner adjustment are included, for example. In Thread operation, functions such as Threading, Thread cutting and Lower thread winding are included, for example. In Pattern selection, functions such as Selection of icon, Selection of pattern number and selection of use are included, for example.

As shown in FIG. 3, the embroidery sewing mode has the following functions according to the classification of the work. In the sewing execution, there are the functions of Start embroidery and Temporary stop. In Sewing operation (frame moving), functions such as Forward movement of embroidery frame, Backward movement of embroidery frame, Adjustment of embroidery position in ±X direction and Adjustment of embroidery position in ±Y direction are included, for example. In Thread operation, functions such as Threading, Thread cutting and Lower thread winding are included, for example. In Pattern selection, functions such as Selection of icon, Selection of file name and Wired/wireless reception from outside are included, for example. In Pattern edit, functions such as Combination of patterns, Position adjustment, Rotation, Magnification/reduction, Color change and Character (letter) selection.

As shown in FIG. 4, the following functions are common for both the normal sewing mode and the embroidery sewing mode according to the classification of the work. In Various settings, functions such as Settings of normal sewing, Settings of embroidery sewing and Settings of wireless LAN are included, for example. In Operation explanation, functions such as Illustration of still image and Reproduction of moving image are included, for example.

Display Switching According to Mode

Figure 7:
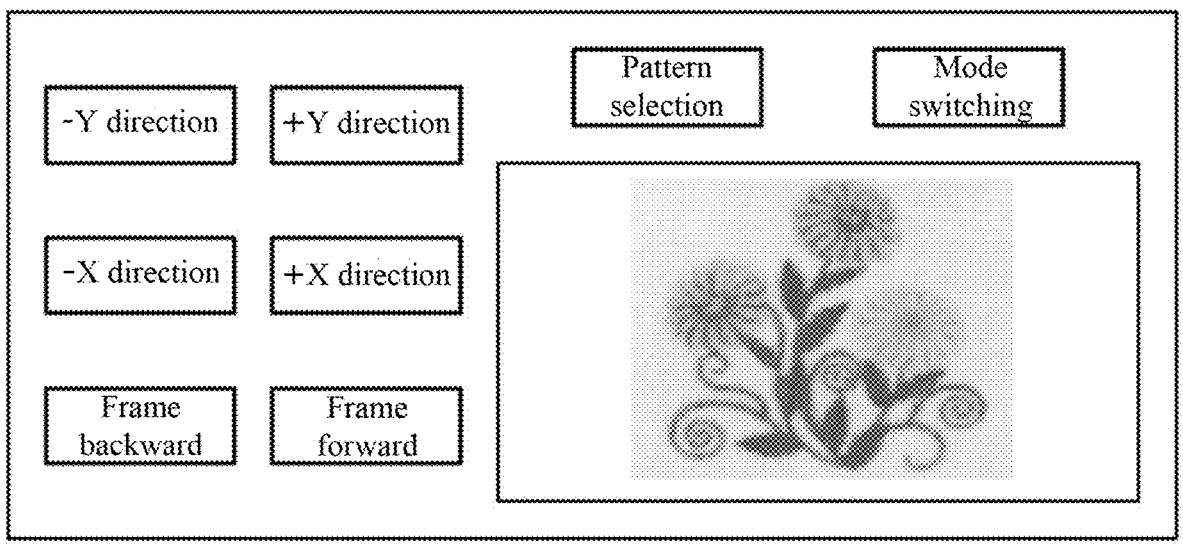
FIG. 7 is a drawing showing an arrangement example of buttons of the embroidery sewing mode in the sewing machine concerning an embodiment of the present invention.

Among the functions shown in FIG. 2 to FIG. 4, frequently used functions in the sewing work are the functions categorized in Sewing execution, Sewing operation and Manual adjustment of sewing. Since these functions such as Start sewing (embroidery), Temporary stop, Back stitch, Stop stitch, Forward/backward movement of embroidery frame are frequently used functions in general, the operation buttons corresponding to these functions are displayed on the operation display unit 11 by default so that these operation buttons enter in the visual field of viewing the needle root including the thread and the needle (as shown in FIG. 6 and FIG. 7). As explained above, by considering the arrangement of the operation buttons displayed on the operation display unit 11, convenience of the user can be improved.

Although the names of the functions categorized in the sewing work are different between the normal sewing mode and the embroidery sewing mode, the display content can be switched according to the mode by using a liquid crystal display.

FIG. 5 illustrates the correspondence of the operation buttons between the normal sewing mode and the embroidery sewing mode at the same position on the operation display unit 11. For example, "Back stitch" in the normal sewing mode corresponds to "Backward movement of embroidery frame" in the embroidery sewing mode, "Stop stitch" in the normal sewing mode corresponds to "Adjustment of embroidery position in −X direction" in the embroidery sewing mode, "Shift of top/bottom dead point of needle bar" in the normal sewing mode corresponds to "Adjustment of embroidery position in −Y direction" in the embroidery sewing mode, "Presser lift" in the normal sewing mode corresponds to no operation button (button is not arranged) in the embroidery sewing mode, "Feed amount adjustment" in the normal sewing mode corresponds to "Forward movement of embroidery frame" in the embroidery sewing mode, "Amplitude amount adjustment" in the normal sewing mode corresponds to "Adjustment of embroidery position in +X direction" in the embroidery sewing mode, and "Thread tensioner adjustment" in the normal sewing mode corresponds to "Adjustment of embroidery position in +Y direction" in the embroidery sewing mode. The above described contents are illustrated in FIGS. 6 and 7. As explained above, by arranging the operation buttons at the same position for the different sewing modes, the visual range to be recognized by the user can be kept small.

Although GUI operations (graphical operations) using the screen display unit 12 are suitable for carrying out fine operation, the screen display unit 12 cannot be arranged near the needle root due to the structure of the sewing machine. The following functions can be displayed on the screen display unit 12 which is separate from the needle root without any problems, not displayed on the operation display unit 11. 1) Embroidery selection using a list view of icons or a thumbnail display, 2) Embroidery edit using a drag operation or a gesture operation, 3) Pattern selection using an interactive method, 4) Display of animation related to needlework of pattern, 5) Display of movie or document for explaining operations 6) Operation of data transfer using a USB communication or a wireless communication. Different from the sewing work, real-time property is not required for these functions. In addition, these functions are preferably operated on a high-resolution large screen because information amount is large.

Configuration of Sewing Machine

Figure 8:
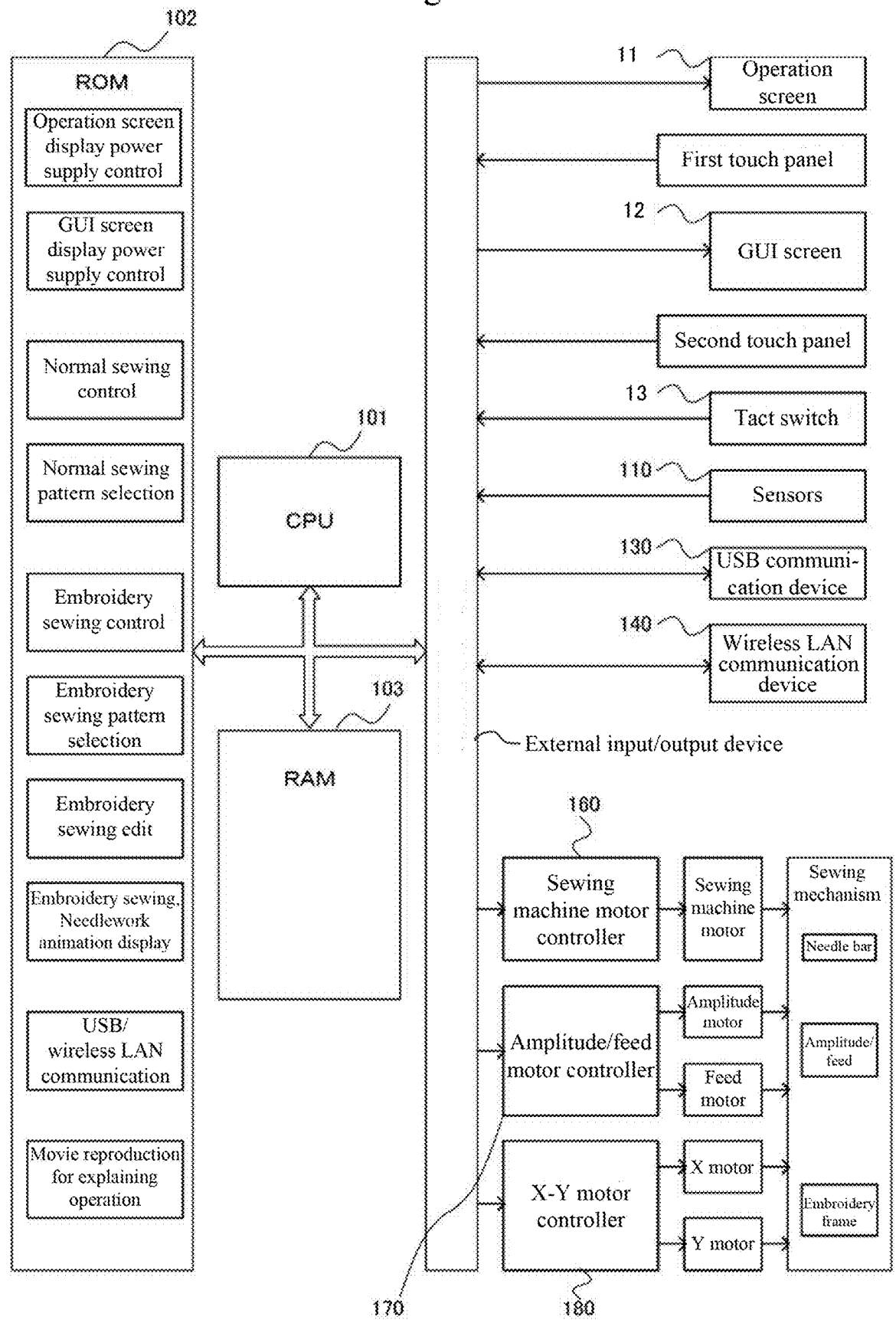
FIG. 8 is a schematic configuration diagram of the sewing machine concerning an embodiment of the present invention.

As shown in FIG. 8, the sewing machine concerning the present embodiment is constituted of a CPU 101, a ROM 102, a RAM 103, an operation display unit (operation screen) 11, a screen display unit (GUI screen) 12, a tact switch 13, sensors 110, a USB communication device 130, a wireless LAN communication device 140, a sewing machine motor controller 160, an amplitude/feed motor controller 170, and an X-Y motor controller 180.

The CPU 101 controls entire operation of the sewing machine according to control programs. In addition, the CPU 101 is connected to various devices via an external input/output device. The ROM 102 stores, as a control unit, an operation screen display power supply control program, a GUI screen display power supply control program, a normal sewing control program, a normal sewing pattern selection control program, an embroidery sewing control program, an embroidery sewing pattern selection control program, an embroidery sewing edit control program, a needlework animation display program (embroidery sewing), a USB/wireless LAN communication program, and a movie reproduction program for explaining operations.

The RAM 103 stores programs read from the ROM 102. The operation display unit (operation screen) 11 is paired with a first touch panel and enables the user to select basic operations of the sewing machine and frequently used patterns such as a straight line and a zigzag pattern in one operation. In addition, the operation display unit 11 displays the guide and warning message for the sewing operation, for example.

The screen display unit (GUI screen) 12 is a high-resolution large screen and paired with a second touch panel. The user can draw and edit the embroidery pattern on the screen display unit 12 and a simulation of the needlework of the embroidery pattern can be displayed on the screen display unit 12, for example. In addition, the screen display unit 12 displays the function of usage selection where the pattern is selected by answering the questions asked from the sewing machine about selection of utility pattern of the normal sewing and purposes of use.

On the tact switch 13, buttons for instructing start/stop of sewing, thread cutting and automatic threading of the sewing machine are gathered. The sensors 110 are constituted of a human sensor, an embroidery frame detecting sensor and an embroidery unit sensor, for example.

The USB communication device 130 is constituted of a USB target controller. The USB communication device 130 is connected with a computer such as a personal computer via a USB cable to transmit and receive data. The wireless LAN communication device 140 is wirelessly connected with an external wireless LAN access point or the like to communicate with other network devices and connect to the Internet via a public line.

The sewing machine motor controller 160 rotates a sewing machine motor based on a command transmitted from the CPU 101 to form seams by the vertical movement of the needle bar. The amplitude/feed motor controller 170 drives an amplitude motor based on a command transmitted from the CPU 101 to amplify the needle bar in a zigzag manner. The amplitude/feed motor controller 170 also drives a feed motor to control an amount of the cloth feed or the forward/backward directions. The sewing mechanism is controlled by the sewing machine motor and the amplitude/feed motor to form seams of a straight line, a zigzag pattern or a representational pattern.

The X-Y motor controller 180 drives an X motor and a Y motor based on a command transmitted from the CPU 101 to move the embroidery frame of the sewing mechanism in the X-direction and the Y-direction. A needle location point is determined by the command transmitted to both motors, and seams of the embroidery are formed by the vertical movement driven by the sewing machine motor. Thus, the pattern is sewn.

Electrical Configuration of Sewing Machine

Figure 9:
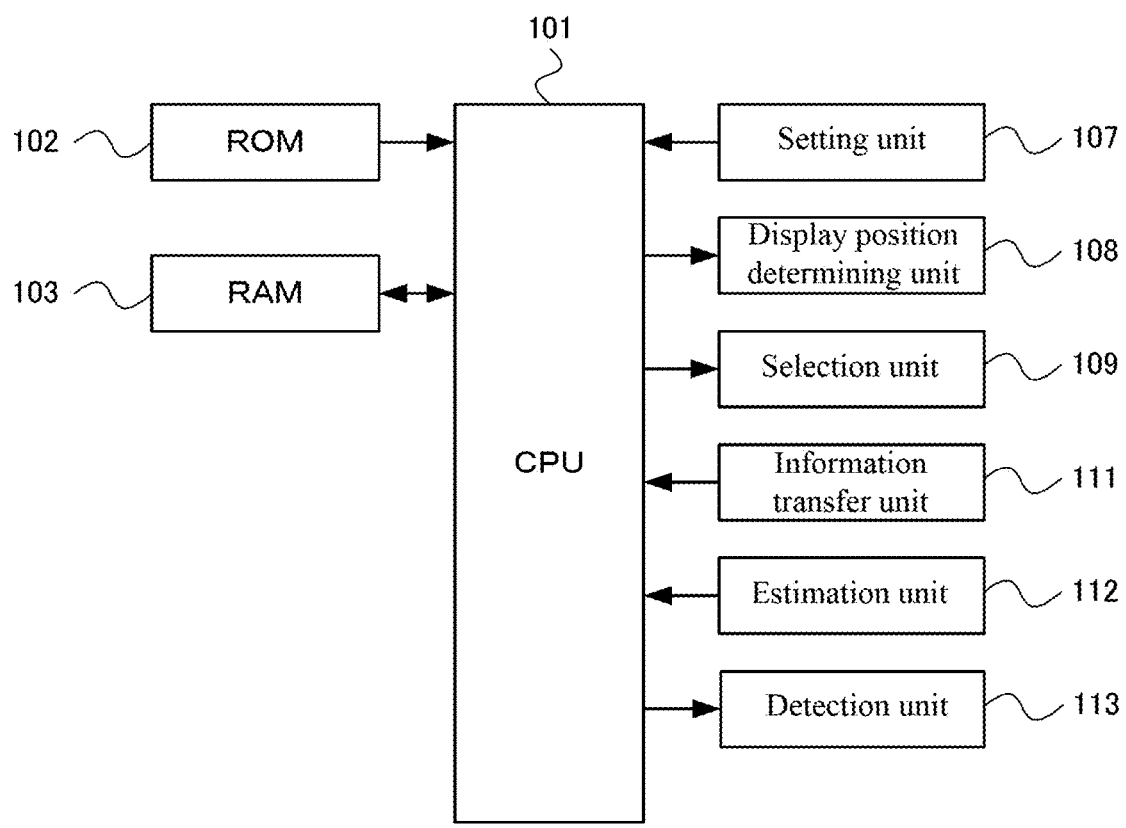
FIG. 9 is an electrical configuration diagram of the sewing machine concerning an embodiment of the present invention.

As shown in FIG. 9, the sewing machine concerning the present embodiment is constituted of a CPU 101, a ROM 102, a RAM 103, a setting unit 107, a display position determining unit 108, a selection unit 109, an information transfer unit 111, an estimation unit 112 and a detection unit 113. Note that the detailed explanation of the components having the same reference numerals as FIG. 8 is omitted because the function is same.

The setting unit 107 sets the operation buttons to be displayed on the operation display unit 11 by receiving the settings input from the user. Accordingly, the default settings preliminarily determined for each sewing mode can be customized depending on the intention of the user. Thus, operability can be improved.

The display position determining unit 108 determines the display position of the operation buttons on the operation display unit 11 based on the settings of the setting unit 107 determined by the instruction of the user. Accordingly, the user can determine the display position of each of the operation buttons by himself/herself according to frequency of use and operation easiness. Thus, operability can be improved.

With respect to all operation buttons displayed on the screen display unit 12 for each sewing mode, the selection unit 109 recognizes the selection of the operation button for desired operation by receiving the instruction from the user. The information transfer unit 111 transfers the information required for displaying the selected operation buttons on the operation display unit 11 to the CPU 101. Accordingly, while the list of the functions of each sewing mode is displayed on the large screen of the screen display unit 12, the information of the operation button corresponding to the desired function can be transferred to the CPU 101 and displayed on the operation display unit 11. Thus, convenience can be improved when selecting the operation button.

The estimation unit 112 estimates the sewing mode which is intended to be performed by the user. Specifically, the estimation unit has an embroidery frame detecting sensor and an embroidery unit sensor, for example. The sewing mode is estimated as the embroidery sewing mode when signals are received from these sensors and the sewing mode is estimated as the normal sewing mode when signals are not received from the embroidery frame detecting sensor and the embroidery unit sensor. Furthermore, the estimation unit memorizes an operation history of the user and estimates the sewing mode from the operation history. Note that the operation display unit 11 displays the operation buttons corresponding to the estimated sewing mode based on the above described estimation result.

The detection unit 113 detects an operation condition and a usage condition of the user with respect to a plurality of display units. Then, the CPU 101 switches the display unit to a sleep mode about the display unit which is judged by the detection unit 113 not to be operated or used. Namely, since a plurality of display units is not simultaneously used, the display of the unnecessary display unit is turned off. Thus, the visual line of the user can be guided to the necessary display unit. Note that the detection unit 113 can have a human sensor, for example, as a detection means.

Linkage of A Plurality of Display Screens

In order to explain the linkage of a plurality of display screens, the display screen constituted by the operation display unit 11 for the sewing control arranged near the needle root and the screen display unit (GUI screen) 12 arranged at a body part on the right end is used as an example.

In case of the normal sewing mode, if an X-Y mechanism of the embroidery sewing is not attached when the sewing machine 10 is turned on, an ON/OFF state of the switch attached to a joining part is detected and the sewing machine 10 is started in the normal sewing mode. At that time, the operation display unit 11 is turned on and displays the operation buttons related to the normal sewing as shown in FIG. 6. On the other hand, the screen display unit (GUI screen) 12 is turned off. This is because the operation made by the display of the operation display unit 11 is enough for the selection and the sewing operation of the basic patterns such as straight sewing and zigzag sewing.

When sewing other decorative patterns or monograms, the screen display unit (GUI screen) 12 is turned on and displayed by pressing "Pattern selection" button. Thus, an icon list of the patterns, a character string input screen or an interactive pattern selection screen is displayed. Although the operation display unit 11 is still displayed at that time, when the user still continues to select the pattern on the screen display unit (GUI screen) 12, the operation display unit 11 is turned off and not displayed after a predetermined time has passed.

When the pattern is determined by the operation of the screen display unit (GUI screen) 12, the operation display unit 11 is turned on and the image of the selected pattern is displayed on the operation display unit 11. Then, the sewing operation can be started by using the other buttons and the tact switch 13. Furthermore, when the sewing is started by pressing "Start" button of the tact switch 13, the screen display unit (GUI screen) 12 is turned off.

In case of the embroidery sewing mode, if the X-Y mechanism of the embroidery sewing is attached when the sewing machine 10 is turned on, the state of the switch attached to the joining part is detected and the sewing machine 10 is started in the embroidery sewing mode. In this case, the operation display unit 11 is turned off and the menu screen is displayed on the screen display unit (GUI screen) 12.

Here, the pattern can be selected by pressing the pattern icon or selected from the list of the file names, for example. Then, editing work such as combination of the patterns, positional adjustment, size change and rotation is performed for the selected pattern, and [OK] button is pressed on the screen display unit (GUI screen) 12. Thus, the instruction for determining the pattern is given to the sewing machine 10. Then, the operation display unit 11 is turned on and an image figure showing the buttons required for the sewing operation and the determined embroidery pattern is displayed.

Furthermore, when the embroidery operation is started by pressing "Start" button of the tact switch 13, the screen display unit (GUI screen) 12 is turned off. Note that it is possible to set the time to turn off the screen display unit (GUI screen) 12 after a predetermined time has passed.

However, while the function of "Needlework animation" is being performed, the screen display unit (GUI screen) 12 is not turned off because the animation synchronized with the actual sewing situation is displayed. Nevertheless, when a predetermined time has passed after the not illustrated human sensor arranged on the upper part of the screen display unit (GUI screen) 12 detects that the user is not existed in front of the sewing machine 10, the screen display unit (GUI screen) 12 is turned off. In addition, in a state that the sewing machine 10 is in the sewing operation and the screen display unit (GUI screen) 12 is turned off, if the sewing operation is interrupted because of color change or thread cut, the screen display unit (GUI screen) 12 is turned on to display the next thread color name/thread number or inform the position of the thread cut by a graphic screen.

As explained above, only one screen is made effective when switching a plurality of screens according to the operation of the user and operation status. Thus, eyes of the user can be guided to the screen to be seen.

Processing of Sewing Machine

The processing of the sewing machine 10 concerning the present embodiment will be explained by using FIG. 10 to FIG. 15.

Processing when Power is Supplied

Figure 10:
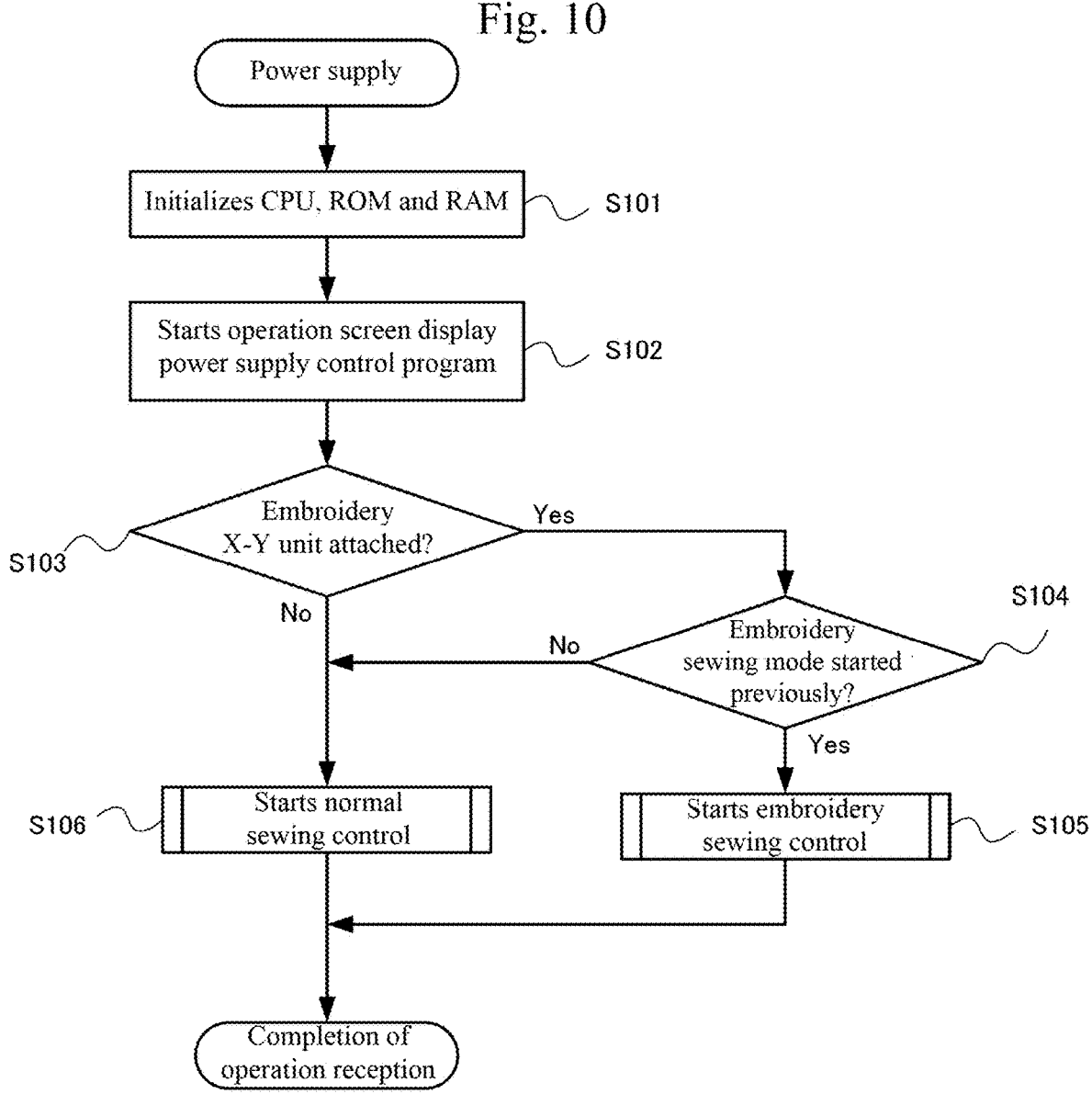
FIG. 10 is a drawing showing an operation processing when power is supplied to the sewing machine concerning an embodiment of the present invention.

The processing of the sewing machine when power is supplied will be explained by using FIG. 10.

First, when power of sewing machine 10 is supplied, the CPU 101, the ROM 102 and the RAM 103 are initialized (step S101). Then, the operation screen display power supply control program is decompressed in the RAM 103 and started (step S102).

When the operation screen display power supply control program is started, a status of an embroidery X-Y mechanism sensor is checked to judge whether or not an embroidery X-Y unit is attached (step S103). When the embroidery X-Y unit is attached ("Yes" in step S103), whether or not the embroidery sewing mode is started is determined depending on the previous usage condition (step S104).

When the embroidery X-Y unit is not attached ("No" in step S103) or when the previous usage condition is not the embroidery sewing mode even if the embroidery X-Y unit is attached ("No" in step S104), the normal sewing control program is loaded and the control is started (step S106). On the other hand, when the embroidery X-Y unit is attached and the previous usage condition is the embroidery sewing mode ("Yes" in step S104), the embroidery sewing control program is loaded and the control is started (step S105). Then, the hardware initialization and other necessary preparations are performed. Thus, the sewing machine is shifted to the state of receiving the operation of the user.

Processing of Normal Sewing Control

Figure 11:
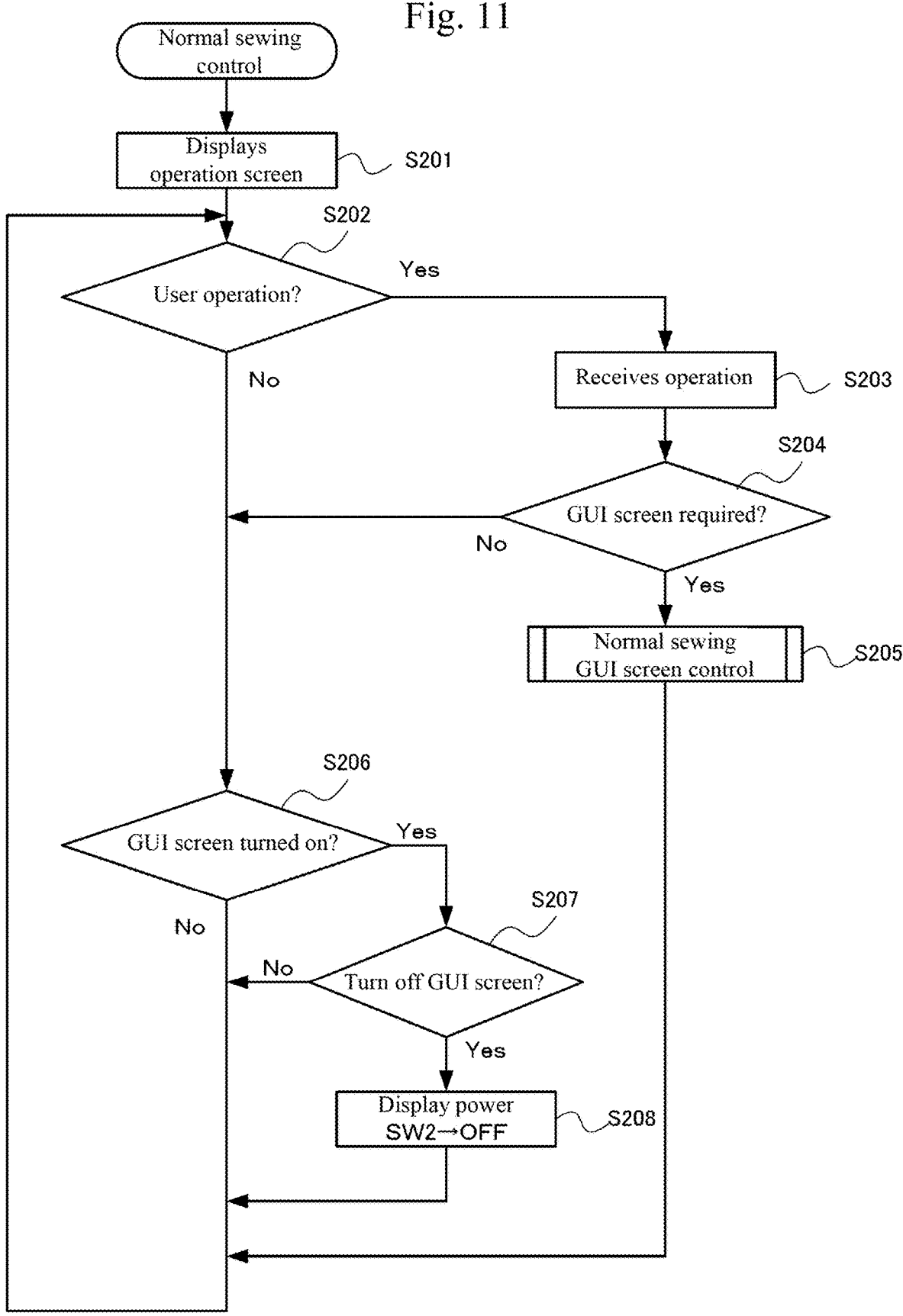
FIG. 11 is a processing flowchart of a normal sewing control program of the sewing machine concerning an embodiment of the present invention.

The processing of the normal sewing control will be explained by using FIG. 11.

The operation buttons such as back stitch and stop stitch and pattern selection buttons used in the normal sewing are displayed on the operation display unit (operation screen) 11 (step S201). When the user operates the first touch panel and the tact switch 13 ("Yes" in step S202), the operation is received (step S203). When the screen display unit (GUI screen) 12 is required after the above operation ("Yes" in step S204), a processing of a normal sewing GUI screen control is invoked (step S205). Although not illustrated in FIG. 11, when the mode is switched from the normal sewing mode to the embroidery sewing mode by the operation, the embroidery sewing control program is invoked.

While the operation requiring the screen display unit (GUI screen) 12 continues, the later described processing of normal sewing GUI screen control receives the operation of the user instead of the normal sewing control. When the screen display unit (GUI screen) 12 becomes unnecessary, the processing is returned to the normal sewing control and the control screen is displayed again.

In step S204, when the operation does not require the screen display unit (GUI screen) 12 ("No" in step S204) or when the user does not perform the operation ("No" in step S202), a condition of turning off the screen display unit (GUI screen) 12 is checked (step S206).

When the screen display unit (GUI screen) 12 is turned on ("Yes" in step S206), it is judged whether or not the condition of turning off the screen display unit (GUI screen) 12 is satisfied (step S207). As examples of the condition, it is judged whether or not a predetermined time has passed after the operation of the screen display unit (GUI screen) 12 is finished or whether or not the human sensor detects that the user is not existed. When the condition of turning off the screen display unit (GUI screen) 12 is satisfied ("Yes" in step S207), an OFF signal is outputted to a display power switch SW2 (step S208) to turn off the display of the screen display unit (GUI screen) 12. The step is returned to step S202 when the screen display unit (GUI screen) 12 is turned off ("No" in step S206), when the processing of normal sewing GUI screen control is invoked, or when the OFF signal is outputted to the display power switch SW2.

Normal Sewing GUI Screen Control

Figure 12:
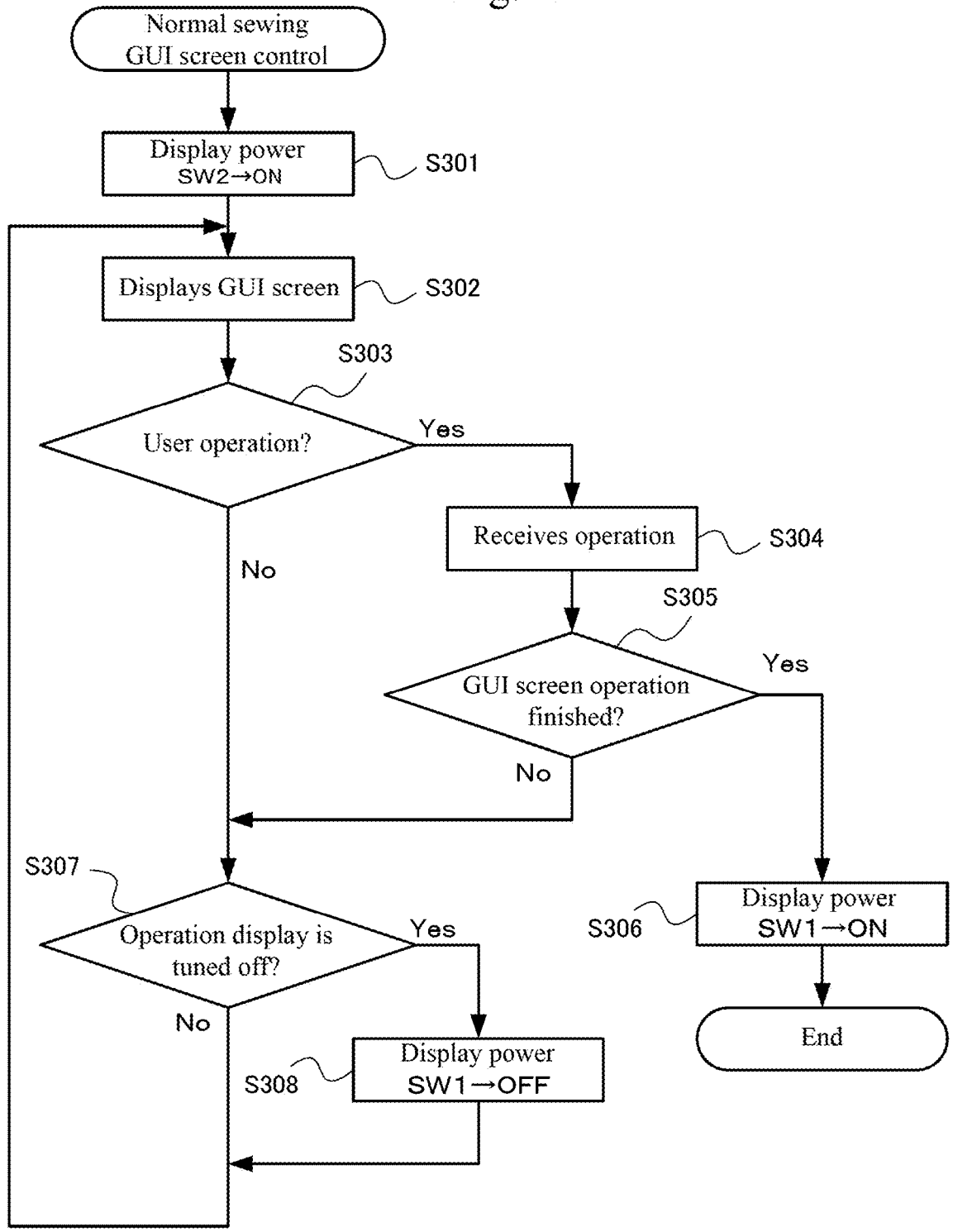
FIG. 12 is a processing flowchart of a normal sewing GUI screen control of the sewing machine concerning an embodiment of the present invention.

The processing of the normal sewing GUI screen control will be explained by using FIG. 12.

At a time when the program is invoked, the display power is not yet supplied to the screen display unit (GUI screen) 12. Hence, an ON signal is outputted to the display power switch SW2 to validate the screen display unit (GUI screen) 12 (step S301).

According to the instruction transmitted from the normal sewing control program, the screen display unit (GUI screen) 12 is displayed (step S302) and the user operation is waited (step S303). When the user operation is performed ("Yes" in step S303), the processing is carried out according to the user operation (step S304).

If the start of sewing or other operations which do not require the screen display unit (GUI screen) 12 any more are performed ("Yes" in step S305), an ON signal is outputted to a display power switch SW1 (step S306) to turn on the operation display unit 11. Thus, the control is returned to the normal sewing control program and the processing is finished.

On the other hand, when the operation of the user still requires the screen display unit (GUI screen) 12 ("No" in step S305), the GUI screen control is continued. When the operation is continued by using the screen display unit (GUI screen) 12 ("Yes" in step S307), the display of the operation display unit 11 becomes unnecessary. Accordingly, after the predetermined time has passed, an OFF signal is outputted to the display power switch SW1, the display of the operation display unit 11 is turned off (step S308) and the step is returned to step S302.

Processing of Embroidery Sewing Control

Figure 13:
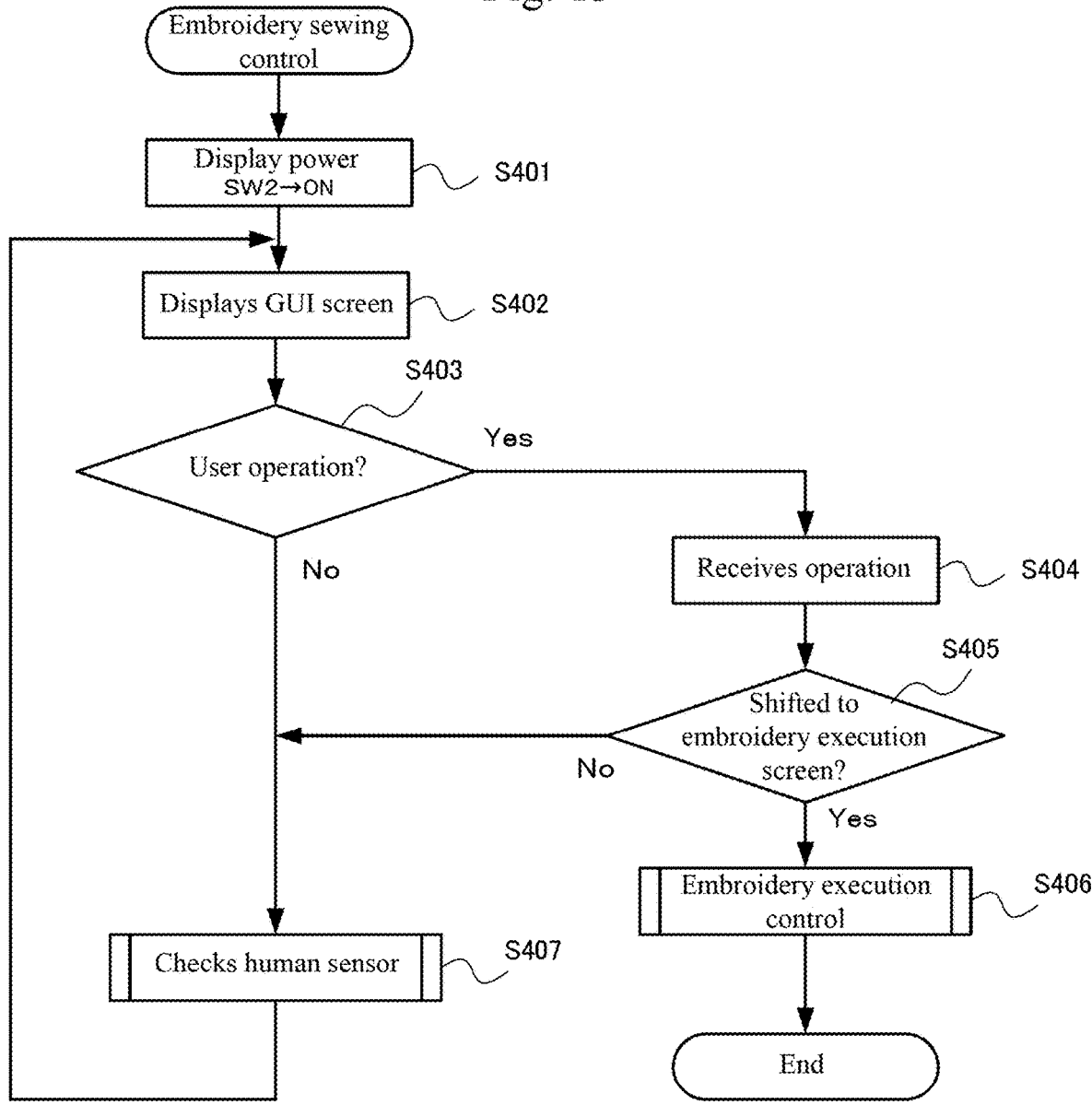
FIG. 13 is a processing flowchart of an embroidery sewing control of the sewing machine concerning an embodiment of the present invention.

The processing of the embroidery sewing control will be explained by using FIG. 13.

First, since the display power of the screen display unit (GUI screen) 12 is normally turned off, an ON signal is outputted to the display power switch SW2 to turn on the screen display unit (GUI screen) 12 (step S401). According to the operation condition of the time, an embroidery pattern selection screen or an embroidery edit screen is displayed on the screen display unit (GUI screen) 12 to receive the operation of the user (step S402).

When the user performs the operation of the second touch panel and the tact switch 13 ("Yes" in step S403), the operation is received (step S404). When the screen is shifted to an embroidery execution screen by the operation ("Yes" in step S405), an embroidery execution control program is invoked (step S406) and the following control is executed by the embroidery execution control program.

When the operation is not performed ("No" in step S403) or when the screen is not shifted to the embroidery execution screen ("No" in step S405), a status of the human sensor is checked (step S407). When the user is not detected for more than a predetermined time, an OFF signal is outputted to the display power switch SW2 and the screen display of the screen display unit (GUI screen) 12 is turned off until the user returns, for example.

Embroidery Execution Control

Figure 14:
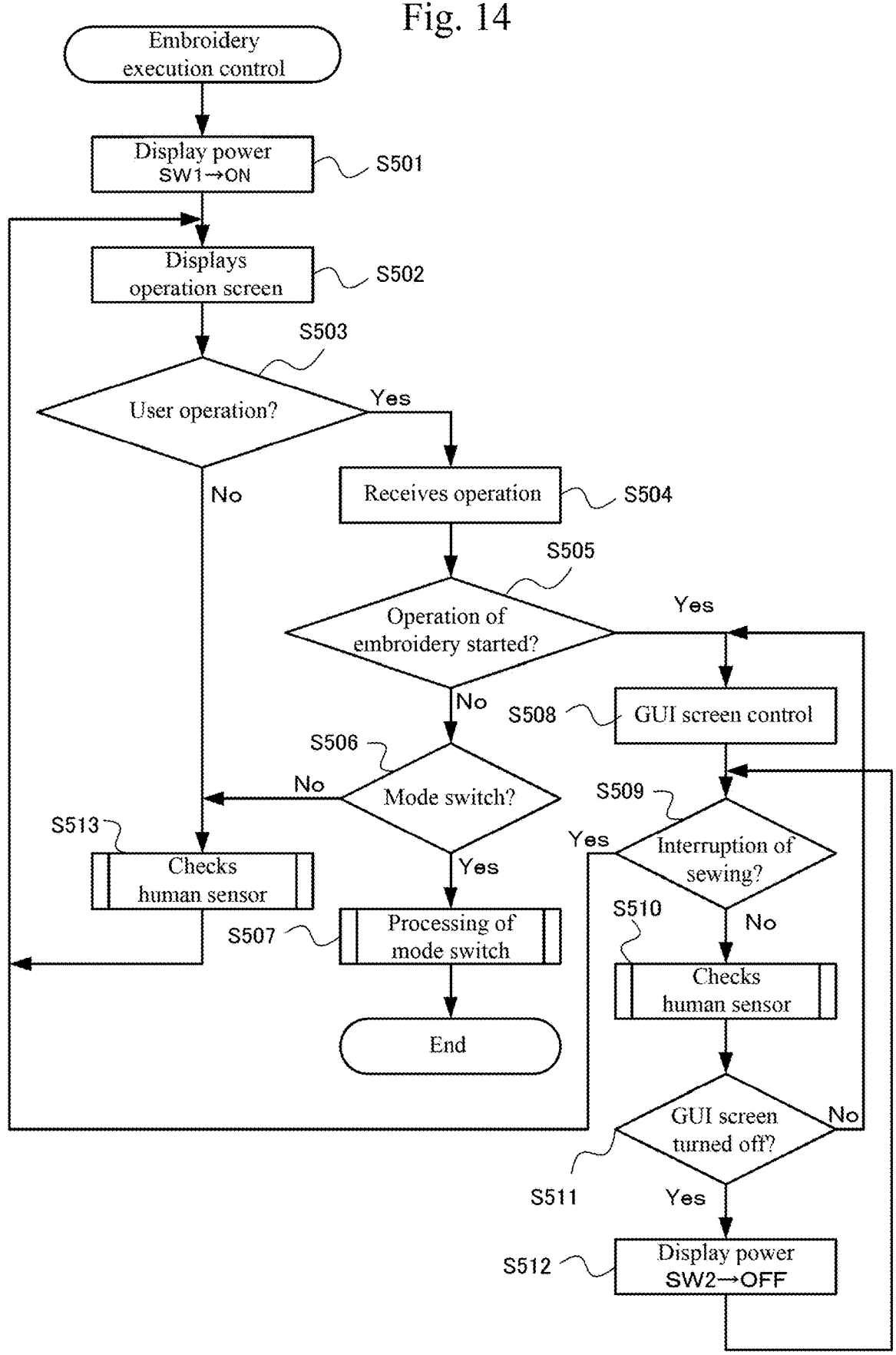
FIG. 14 is a processing flowchart of an embroidery sewing execution control of the sewing machine concerning an embodiment of the present invention.

The processing of the embroidery execution control will be explained by using FIG. 14.

Since the operation display unit 11 is not used in the processing of the embroidery pattern selection and the embroidery edit, an ON signal is outputted to the display power switch SW1 (step S501), and then the contents are displayed on the operation display unit (operation screen) 11.

When the operation of the sewing machine is interrupted and the user operation is not performed, a condition of turning off the screen display unit (GUI screen) 12 is judged by the check result of the human sensor (step S503 to step S513). When some operations are performed by the user ("Yes" in step S503), the operation is received (step S504).

At that time, when the operation is the start operation of the embroidery (step S505), the internal mode is switched to the embroidery operation to control the sewing operation (step S505 to step S508). During the operation of the embroidery sewing, the current position of the sewing and the like is displayed on the screen display unit (GUI screen) 12 (step S508). When the sewing operation is interrupted because of color change, completion of the sewing, interruption of the sewing by the user, thread cut or other reasons ("Yes" in step S509), the internal mode is switched to the interruption to return to the interrupted control (step S502).

When the user continues the sewing ("No" in step S509), the human sensor is periodically checked (step S510) to judge the condition of turning off the screen display unit (GUI screen) 12 (step S511).

When the embroidery sewing is not started ("No" in step S505), whether or not the operation performed by the user is the mode switch (step S506). When the operation is the mode switch ("Yes" in step S506), the processing of mode switch is performed (step S507). On the other hand, when the operation is not the mode switch ("No" in step S506), the human sensor is checked (step S513).

When the screen display unit (GUI screen) 12 is not turned off ("No" in step S511), the control of the sewing operation is continued. When the screen display unit (GUI screen) 12 is turned off ("Yes" in step S511), an OFF signal is outputted to the display power switch SW2 (step S512) to turn off the screen display unit (GUI screen) 12. Then, the control of the sewing operation is performed while the screen display unit (GUI screen) 12 is kept to be turned off until the screen display unit (GUI screen) 12 is turned on again depending on the status of the human sensor.

Check Processing of Human Sensor

Figure 15:
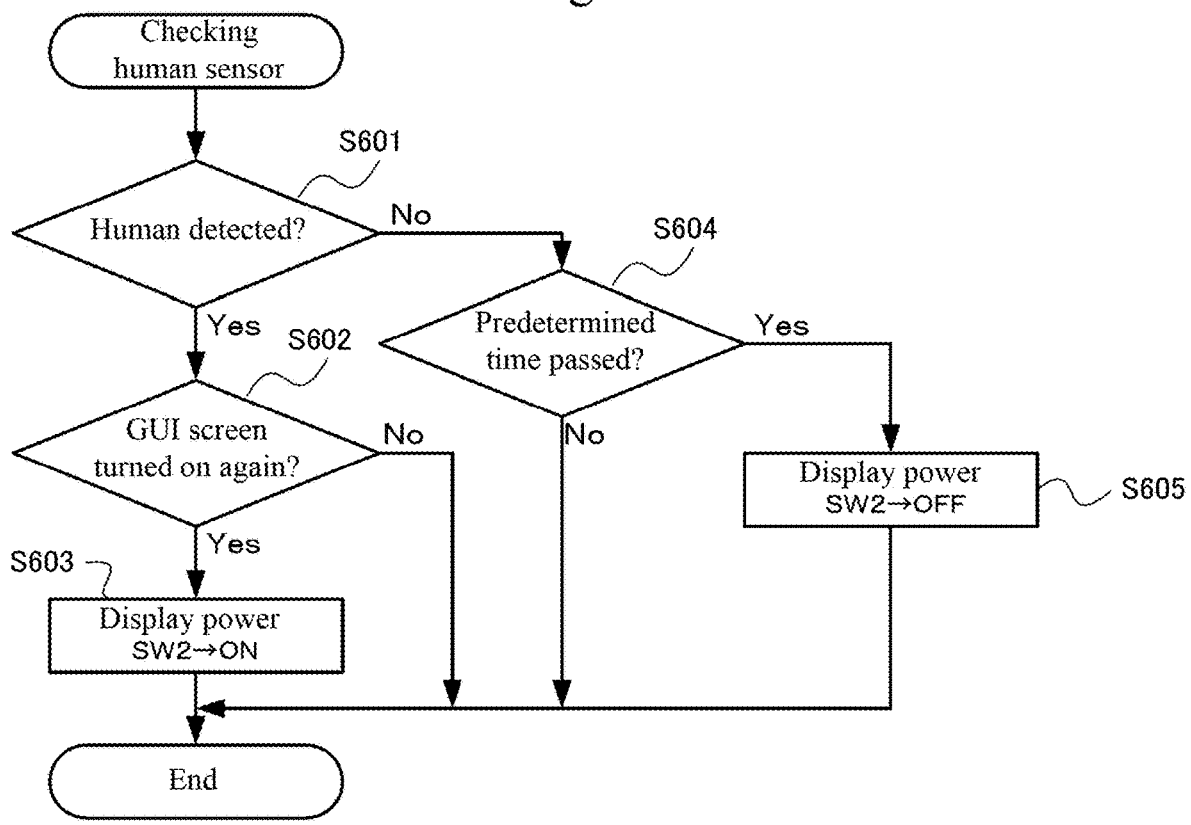
FIG. 15 is a processing flowchart of a check processing executed by a human sensor of the sewing machine concerning an embodiment of the present invention.

The check processing executed by the human sensor will be explained by using FIG. 15.

The human sensor detects whether or not a human exists in front of the sewing machine 10 (step S601). When the human exists ("Yes" in step S601), whether or not the screen display unit (GUI screen) 12 is required to be turned on again is judged (step S602).

Since the normal sewing mode basically operates without using the screen display unit (GUI screen) 12, the screen display unit (GUI screen) 12 is not required to be turned on again. On the other hand, the screen display unit (GUI screen) 12 is required in some cases in the embroidery sewing mode. In such case, an ON signal is outputted to the display power switch SW2 to turn on the screen display unit (GUI screen) 12 again (step S603).

When a predetermined time has passed in a state that the human does not exist ("Yes" in step S604), an OFF signal is outputted to the display power switch SW2 to turn off the screen display unit (GUI screen) 12 (step S605).

Effect of the Present Embodiment

As explained above, in the present embodiment, the screen display unit is divided into a plurality of screen displays. Thus, the display unit can be selected to be arranged at a position suitable for the purpose of use and to have a size suitable for the mechanism. In addition, if the functions (operation buttons) frequently used in the sewing operation are gathered near the needle root, the user doesn't have to move the visual line largely during the sewing operation, and the moving distance of the hand of the user can be reduced. Thus, the user can concentrate on the sewing work.

Even when the arrangement place is small, the functions can be arranged in the limited space by switching the functions of the buttons and display names between the normal sewing mode and the embroidery sewing mode. Furthermore, since the display units are arranged depending on the purpose of use, it is not necessary to validate all of the display screens in all works. Depending on the content of the work, the display screens are turned on/off while being linked with each other. Thus, the screen to be displayed can be limited. Because of this, the visual line of the user can be guided to the screen to be seen and the user can concentrate on the work.

Although the embodiments of the present invention are explained above with reference to drawings, the specific configuration is not limited to the above described embodiments. The specification can be changed within a range being not deviated from the subject-matter of the present invention.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A sewing machine, comprising:
    an operation display unit configured to display operation buttons, the operation display being arranged at an arm part;
    a screen display unit arranged at a position different from the operation display unit;
    a selection unit configured to recognize a selection of the operation buttons displayed on the screen display unit for displaying the selected operation buttons on the operation display unit by receiving an instruction from a user; and
    an information transfer unit configured to transfer an information required for displaying the selected operation buttons on the operation display unit to a CPU, wherein
    the operation display unit is a touch panel using a liquid crystal display, and
    the screen display unit is a touch panel using a liquid crystal display.

2. The sewing machine according to claim 1, wherein the operation display unit is arranged at a needle side from a center of the arm part.

3. The sewing machine according to claim 1, further comprising:
    a display position determining unit for determining a display position of the operation buttons in the operation display unit.

4. The sewing machine according to claim 1, wherein the screen display unit is arranged at a leg column part.

5. The sewing machine according to claim 1, wherein the operation buttons corresponding to a normal sewing operation or an embroidery sewing operation are displayed on the operation display unit.

6. The sewing machine according to claim 1, further comprising:
    an estimation unit for determining the operation buttons which are displayed on the operation display unit based on an operation history of a user.

7. The sewing machine according to claim 1, further comprising:
    a detection unit for detecting a usage condition of a user; and
    a control unit for controlling to turn on/off the operation display unit or the screen display unit based on the usage condition detected by the detection unit.

* * * * *